July 17, 1923.  1,461,733
H. E. HAWES
PROPELLING DEVICE FOR AIRCRAFT
Filed Oct. 26, 1921  5 Sheets-Sheet 1

INVENTOR
Herbert E. Hawes

July 17, 1923.

H. E. HAWES

PROPELLING DEVICE FOR AIRCRAFT

Filed Oct. 26, 1921

INVENTOR

Herbert E. Hawes

July 17, 1923.

H. E. HAWES

PROPELLING DEVICE FOR AIRCRAFT

Filed Oct. 26, 1921

INVENTOR

Herbert E. Hawes

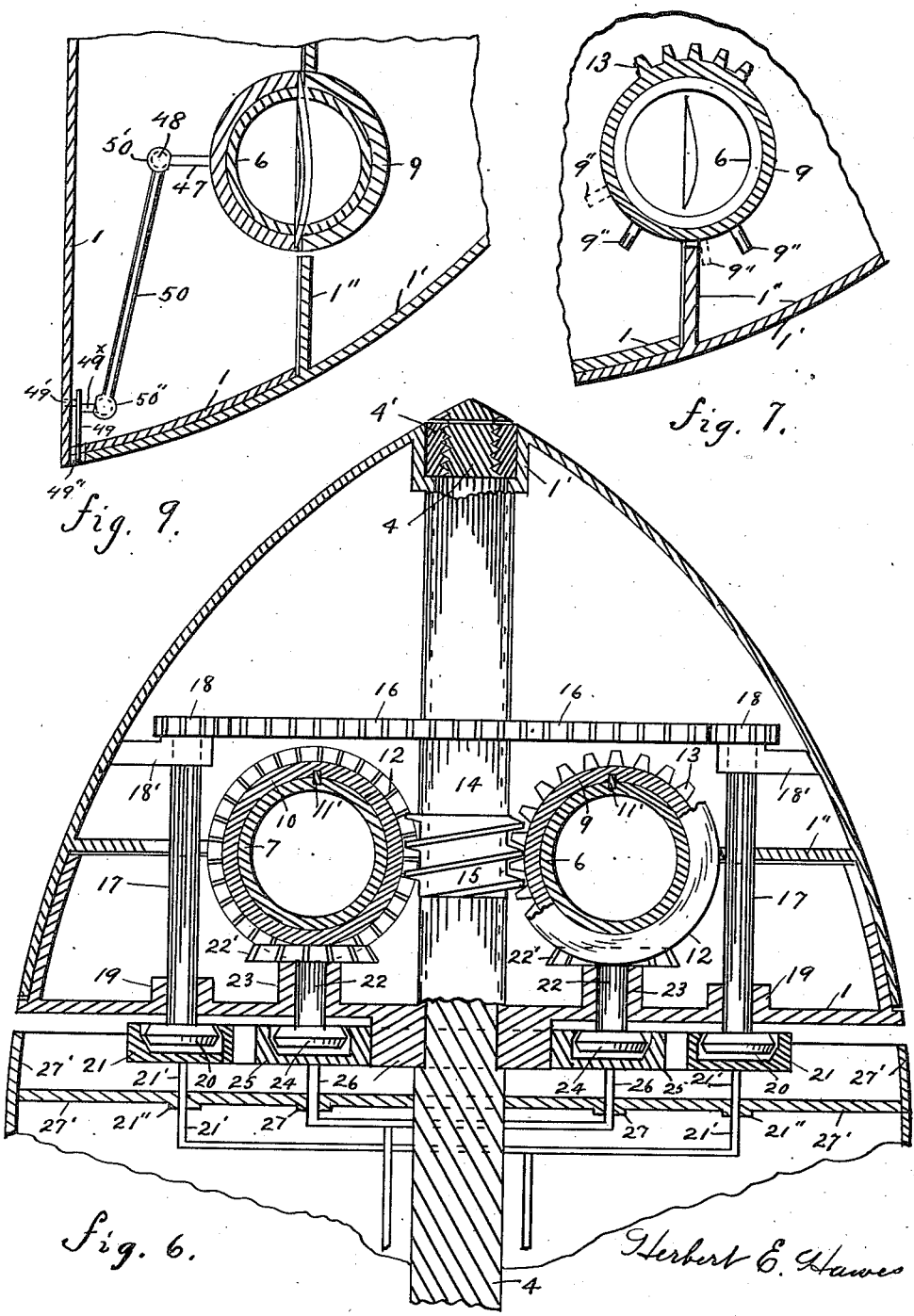

July 17, 1923.
H. E. HAWES
1,461,733
PROPELLING DEVICE FOR AIRCRAFT
Filed Oct. 26, 1921
5 Sheets-Sheet 5
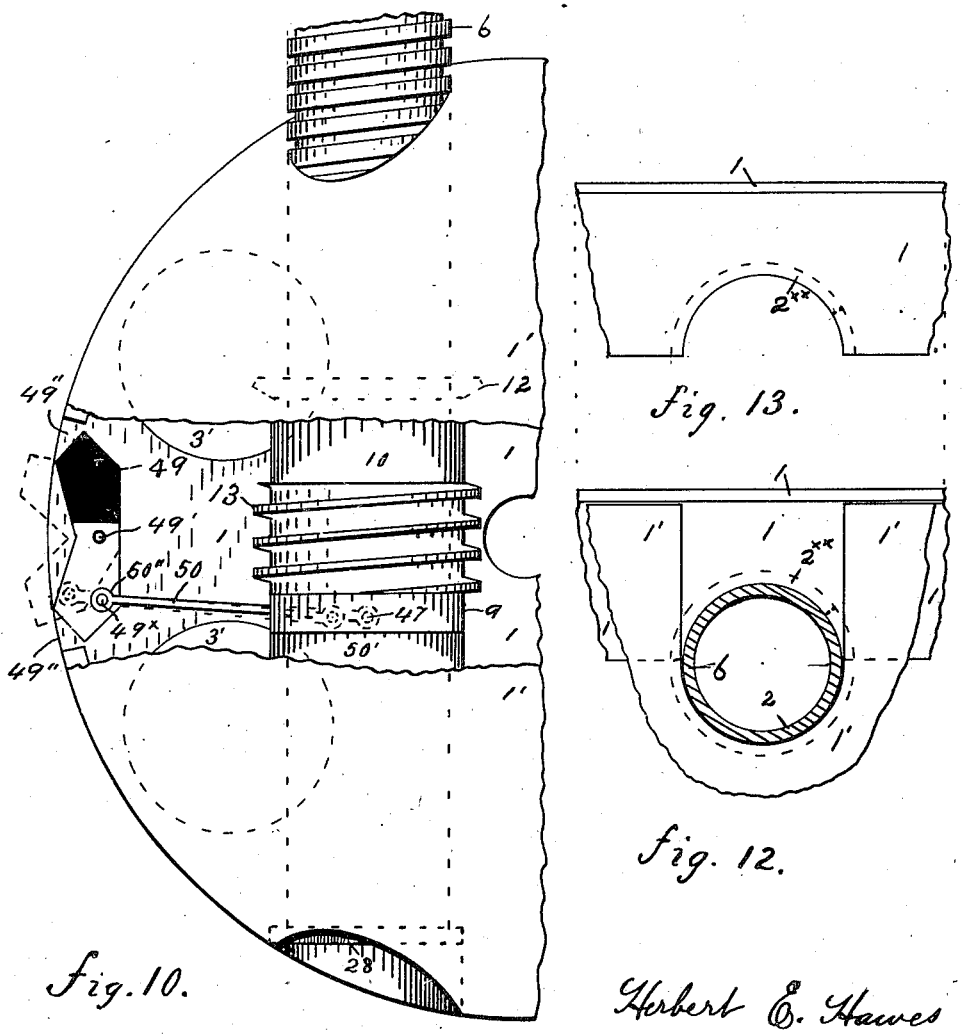

Patented July 17, 1923.

1,461,733

UNITED STATES PATENT OFFICE.

HERBERT E. HAWES, OF MILWAUKEE, WISCONSIN.

PROPELLING DEVICE FOR AIRCRAFT.

Application filed October 26, 1921. Serial No. 510,448.

*To all whom it may concern:*

Be it known that I, HERBERT E. HAWES, a citizen of the United States, and a resident of Milwaukee, Milwaukee County, State of Wisconsin, have invented certain new and useful Improvements in Propelling Devices for Aircraft, of which the following is a specification.

My present invention relates to aircraft generally and more particularly to the propulsion mechanisms thereof.

Its objects comprise provision of a propeller device of novel construction, comprising longitudinally reciprocable blades by which the radial projection, or sweep, of the latter can be varied at will,—that is to say the blades may be projected, or, as it were, lengthened outwardly relatively to the aircraft after the latter has risen from the ground, thereby increasing the propulsive efficiency of the blades and of the propeller as a whole, and thereafter the blades retracted, or, as it were shortened at the time of landing, thereby tending to diminish risk of breakage from their collision with the ground or other obstacles.

Another object of my invention is to provide blades that can be axially rotated or oscillated to reverse or intermediate position or angle of inclination to the air, thereby retarding or reversing the propulsion of the aircraft and facilitating its complete stoppage after landing, or thus varied to economize propulsive force when it is not needed.

Still another object is the provision of clamping means for limiting the axial rotation of the blades and restraining their axial vibration, thus increasing their lives and reducing wear in the moving parts thereof and their actuating means.

Another important object is provision of means whereby the angle of the blades, during rotation of the propeller, may be visually indicated to the aviator at his station in the cockpit.

And a principal object is to provide means whereby the power required to so axially rotate and longitudinally reciprocate the blades may be supplied by aid of the engine through connection with the power shaft.

These and other useful objects I attain by aid of the constructions or their equivalents, hereinafter described and illustrated in the drawings accompanying this specification and forming a part thereof, and in which like reference numerals denote like parts.

Figure 1 is a front elevation of principal parts of my invention located within the interior of my frame, or conoidal support therefore, the front, and other parts, of the latter being cut away for that purpose and also certain other parts such as the power shaft, on the dotted sectional line 1—1 of Figure 2 viewed in the direction of the arrows, and parts of the propeller blades being broken away.

Figure 2 is a top plan view of parts shown in Figure 1, the section of the frame and of several other of the parts being taken on the dotted sectional line 2—2 of Figure 1 and viewed in the direction of the arrows.

Figure 3 is a side elevation of the power shaft and of therewith concentric parts and also of parts located beyond the power shaft when viewed in the direction of the arrow, 1, of Figure 2, intervening parts between the observer and the power shaft being omitted and the frame being cut away on its medial vertical sectional line, and also other parts extending across that line being shown in transverse section.

Figure 6 is in part a view similar to Figure 2 but omitting certain elements and adding others to more fully illustrate particularly the frictional devices by aid of which axial rotations and longitudinal reciprocation are impartable to the counter shafts.

Figure 7 is a detailed view illustrative of means for absolutely limiting the extent of axial rotation of the counter shafts which carry the blades of the propeller.

Figure 9 is a diagrammatic detailed top view illustrative of the device for visually indicating to the aviator the angle of incidence of the blades while the power shaft is rotating.

Figure 10 is a similar side view of the parts shown in Fig. 9.

Figures 12 and 13 are fragmentary detail views to illustrate portions of the walls of the conoidal frame or shell which are cut away to facilitate assemblage.

Figure 1:
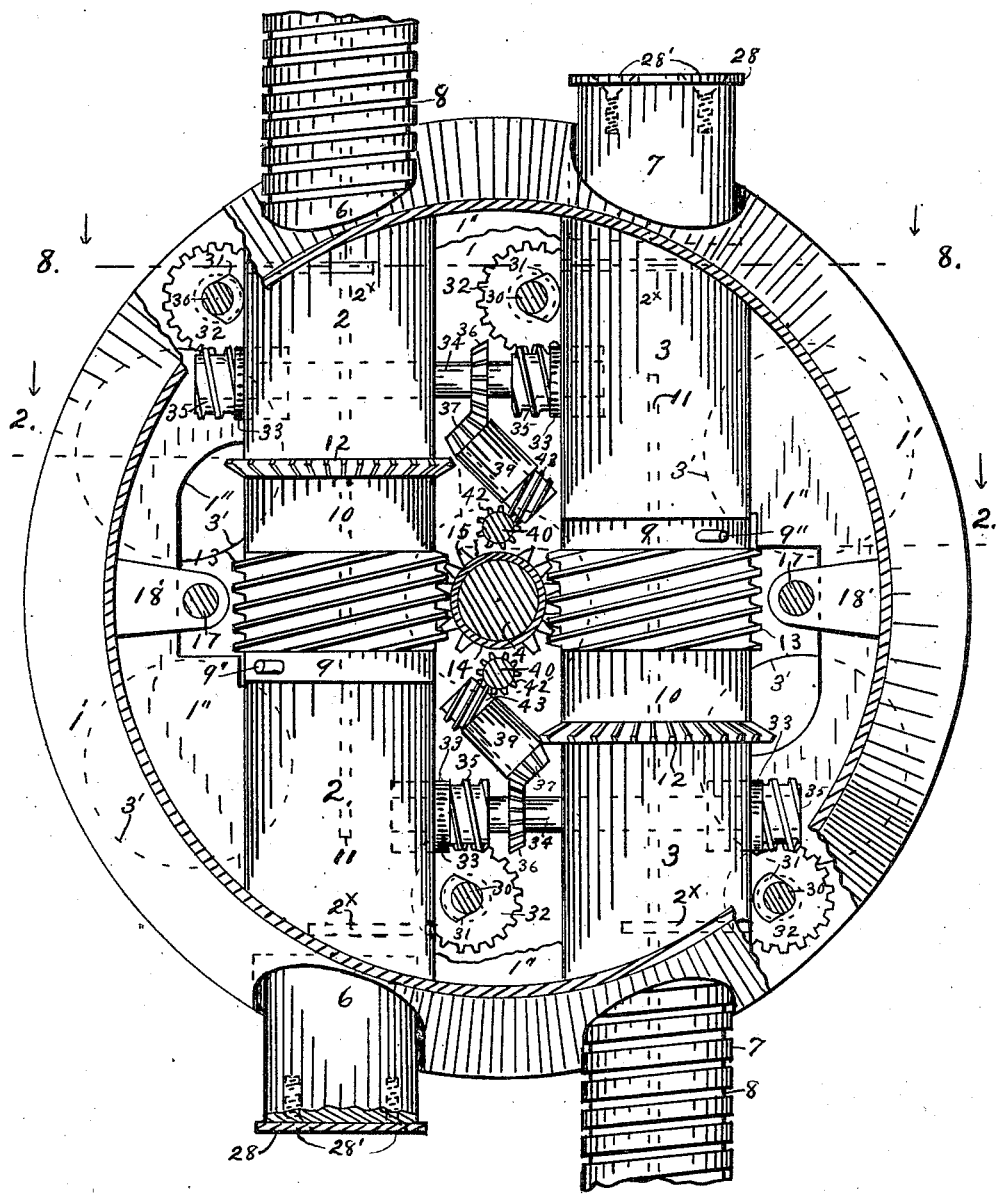

In reducing my invention to practice I make use of a metallic, conoidal, propeller-supporting, frame 1—1'; which is rigidly mounted on a rotary power, or driving, shaft 4 driven by, or forming part of, any well-known motor. Said frame has formed therein, oppositely located, outwardly extending, hereinafter more fully described cylindrical blade-carrying counter-shaft bearings, 2, 3, which are, as shown, offset from the axis of the power shaft.

The conoidal exterior of this hollow frame is in harmony with the streamline of the plane, and it is mounted, preferably, at the extreme front of the fuselage.

It consists of two parts, or sections, 1—1' each having one half of each of the said counter shaft bearings 2, 3, formed therein, and said parts are designed to be bolted or screwed together so that the thus correlated half-bearings register.

A cylindrical bore or seat for the power shaft is formed in the axis of each section and the combined unit is mounted rigidly on the power shaft in any convenient manner.

An annular rib 1" is formed projecting inwardly transversely of the axis of the frame, or cone, around the entire inside of the front section 1' of the cone and is joined to, and connects the bearings 2, 3, together along their mutually axial line.

The outer, front, conoid section, or wall, 1' of the frame overlies or telescopes a similar conoidal section extending forwardly from the rear section or wall 1, and both parts are detachably held together in any convenient manner as for example by a plurality of screw bolts, passing through both walls and extending inwardly to where they may be locked by nuts, such attachments being well known and therefore not shown in the drawings.

To facilitate assemblage, portions of the mutually overlapping or telescoped conoidal walls of the sections 1, 1' of the frame are cut away behind the above referred to bearings as indicated in Figures 12 and 13.

Hand holes 3' are provided in the rear wall of 1, for convenience in adjusting and locking the parts.

The registering cylindrical half-bearings 2, 3 are formed in the outer wall of both members.

Said bearings project inwardly from each side of the frame toward the power shaft, and are, as shown offset to opposite sides thereof. Rotatable blade-bearing counter shafts 6—7 are mounted in said bearings and extend across the cone transversely of the axis of the power shaft, thus being supported on opposite sides of the axis of rotation, and thus deriving, as is important, an extended rigid support.

To impart additional strength and rigidity to the union of the two sections of the frame and their connection with the power shaft, they are held together axially by a nut 4' on the outer threaded end of the power shaft 4, and locked in position by castellating the nut and putting a pin through holes in the shaft end, in the well-known way.

The blade-carrying counter shafts 6—7 are preferably of metal castings which are made cylindrical wherever they extend within or between said bearings during their longitudinal reciprocation, and their outer ends, which project outwardly from the frame, are preferably provided with integral propeller blades having surfaces of usual type, or separate wooden, or other, blades may be rigidly secured thereto as is obvious.

In the outsides of the counter shafts are formed flat top screw threads 8 for that part of their lengths designed to engage in the therewith cooperating internally threaded sleeves 10 and the said counter-shaft-bearings.

The sleeves 10 abut, axially, against the inside ends of the shaft bearings 2—3 on the one side thereof, and, on the other, against a sleeve 9 likewise concentrically encircling the counter shaft, and the last mentioned sleeve is in turn abutted against one of the said shaft bearings projecting inwardly from the opposite side of the frame.

The sleeves 9 and 10 thus fill snugly longitudinally the axial spaces between the bearings 2 and 3 located on the opposite sides of the cone.

In the outside of the cylindrical parts of the counter shafts 6—7 are formed longitudinal grooves or keyways 11, parallel with the axis of the shafts, and extending nearly the full length of the cylindrical portions thereof and cut somewhat deeper than the bottom of the threads 8.

In the bores of the sleeves 9 are mounted longitudinal keys or feathers 11' adapted to fit slidably in the said keyways 11 to hold the same against oscillation. Sleeves 9 fit slidably over the outside, or that is to say, over the flat tops, or surfaces of the counter shafts extending between the incut threads, and helical gears 13 are formed on the periphery thereof.

The screw thread 8 on the outside of the shafts is of coarse pitch, and has the lands, or flat top of the thread much wider than the grooves therof, so that the shaft periphery has a maximum of wearing surfaces.

On the outside of power shaft 4 is mounted rotatably a sleeve 14 having formed on one end thereof a helical gear 15 and on the opposite end a spur gear 16. The sleeve 14 is held in place axially between bosses on the inside of the members 1, 1'. The helical gear 15 meshes cooperatively with the opposed sleeve gears 13, 13, and serves to rotate them synchronously at certain times.

In bearings 18', formed on opposite sides of the interior of the cone, and registering with the bearings 19 located in the rear wall of the section 1 of the frame are mounted dual supplementary shafts 17 disposed in parallelism with the power shaft 4 and extending rearwardly through the rear wall of section 1 of the frame.

On the forward ends thereof are mounted rigidly spur gears 18 meshing mutually with the spur gear 16 on the sleeve 14 surrounding the power shaft.

On the rear ends of said shafts 17 are mounted rigidly friction wheels 20 having oppositely inclined peripheral side friction faces. (Fig. 6.)

On the extreme front end of the fuselage or other relatively stationary part of the aircraft next to the frame 1, 1 are mounted longitudinally slidable rods 21' journalled in the said relatively stationary parts in bearings 21''. A non-rotatable friction ring containing a race-way 21 having dual oppositely inclined friction surfaces located to respectively, in turn, engage the thereto respectively opposed friction faces of the friction wheels 20, is also mounted on the relatively stationary part.

The ring 21 is reciprocable by the aviator longitudinally of the power shaft 4 so as to engage, in turn, opposite friction faces of the wheels 20, and thus cause rotations of the latter in opposite directions accordingly as the ring 21 is moved toward or from the propeller.

It follows that when the propeller is rotating the frictional engagement of the ring 21 with the friction wheel 20 will impart rotation to the supplementary shafts 17 in a given direction and, through the spur gears 18, 16 will rotate the sleeve 14 and thus, by aid of the gear 15, the oscillatable sleeves 9 surrounding the blade carrying counter shafts and thereby axially rotate or oscillate the propeller blades and vary their angles of incidence to the air.

Conversely the engagement of the ring 21 with the opposite sides of the friction pulleys 20 will rotate the supplementary shafts 17 in the opposite direction and incline the blades to an opposite angle.

The mechanism for longitudinally reciprocating, and thereby varying the length of, the blades, is as follows:

On the outer ends of sleeves 10 which are threaded as above described on the blade carrying shafts 6, 7, are formed bevel gears 12.

On shafts 22, disposed parallel with the power shaft 4, in bearing 23 on the rear wall of section 1 of the frame, are mounted bevel gears 22', meshing with the bevel gears 12 on the sleeves 10.

On the opposite ends of the shafts 22 extending through and outside of the wall 1 are mounted friction wheels 24 having oppositely inclined peripheral faces.

Inside of the ring 21 I mount another non-rotatable friction ring 25 on longitudinally slidable shafts 26, journalled in bearings 27, in the front of the fuselage 27', or other relatively stationary part of the aircraft.

The last mentioned ring has dual oppositely inclined friction faces similar to those of the ring previously described, and these are similarly adapted to respectively, in turn, engage opposite inclined friction faces of the wheels 24, and thus produce opposite rotations of the shafts 22, which, in turn, rotate the sleeves 10.

It follows that opposite rotations of the shafts 22 oppositely rotate the sleeves 10 and, through the internal threads 8 thereof, acting upon the externally threaded blade-carrying counter shafts 6, 7, reciprocate the latter longitudinally accordingly as the ring 25 engages the inner or outer inclined sides of the friction pulleys 24 on the counter shafts 22.

The relation of the non-rotatable friction rings to the pulleys 24, 20, is illustrated in Figure 6 of the drawings in which cross sections of the rings are shown.

It will be understood that axial rotation or oscillatory movement of the blade carrying and counter shafts is governed by the sleeve keys 11' in the slots 11 in the shafts 6, 7, while those shafts are being longitudinally reciprocated and the thereby carried propeller blades correspondingly extended or retracted, and also that such reciprocations occur without disturbing the angles of incidence of the blades.

The dual slide shafts 21' projecting from the friction ring 21 also the shafts 26 from the ring 25, may be joined together aft of their respective bearings as diagrammatically illustrated in Figure 6 into single members, both of which may be extended to within reach of the aviator for manipulation, and may be supplied with any convenient mechanism for locking the same against longitudinal or linear movement, as by any well-known suitable friction clamp. The lever locking device shown in Letters Patent No. 1,067,425, granted to me on July 15, 1913, may be used for this purpose.

Figure 3:
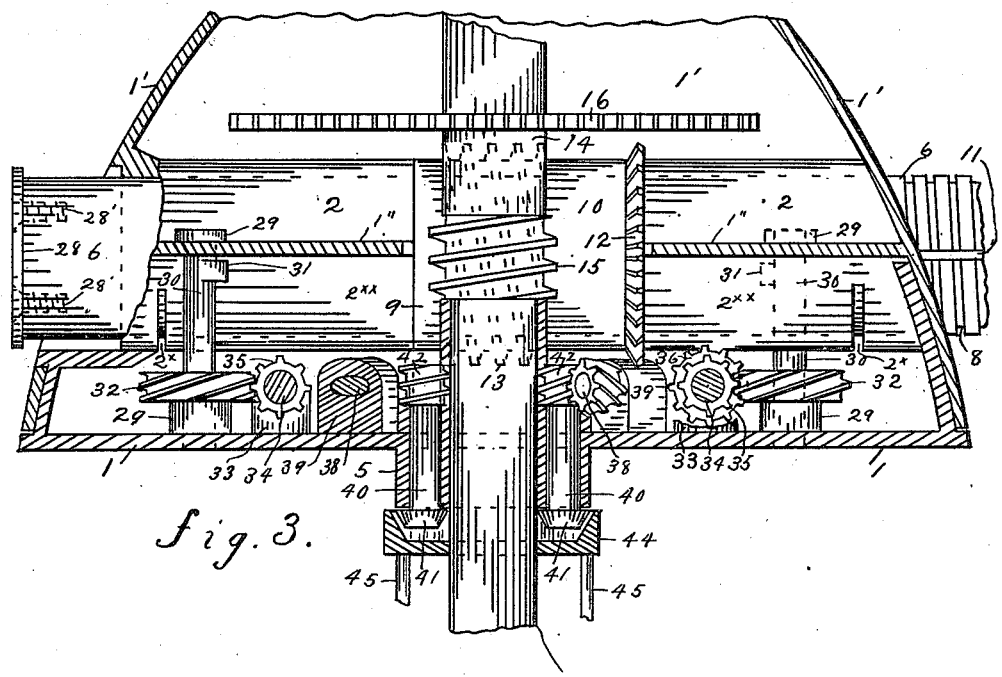

On the cylindrical end of each blade carrying counter shaft 6, 7, opposite to the blades, is attached a circular stop piece 28 (Fig. 3), in any suitable way, for example by screws 28', to arrest and positively limit its outward reciprocation.

This stop, when the extreme of the outward longitudinal movement is attained, lies in a seat therefor countersunk in the side of the frame and so as to sink below the surface thereof to diminish its resistance to the atmosphere.

When this ultimate point of extension of the blades is reached, the friction pulleys 24 slip on the ring 25 and no further longitudinal extension can take place; the ring is then released and moved by the aviator into its neutral position in which none of the friction faces are in contact and the pulleys then become idlers revolving with the propeller but without acting.

In assembling,—the blade shaft, the gears, and the sleeves 10, are first screwed on the counter shafts 6, 7, at like distance from the ends thereof and then the sleeves 9 are slipped on and up against the same. The shafts are next inserted into section 1 of the frame, the gears adjusted in mutual registration, and then section 1' of the frame is put in registering position and the two sections bolted together as above described; but, if preferred, section 1 may, of course, be first keyed on to the power shaft 4 and the counter shafts positioned in that section in the first instance after which the other parts may be assembled as indicated.

To limit the axial rotation or angular oscillation of the blade carrying counter shafts, there are formed on the outside of the sleeves 9 two projections or stops 9" adapted to abut at either extreme of oscillation against the rib 1" on either side thereof (see Fig. 7).

These stops are located at such a distance apart that the blades may have an oscillation of approximately 45° to each side of their neutral position.

Figure 2:
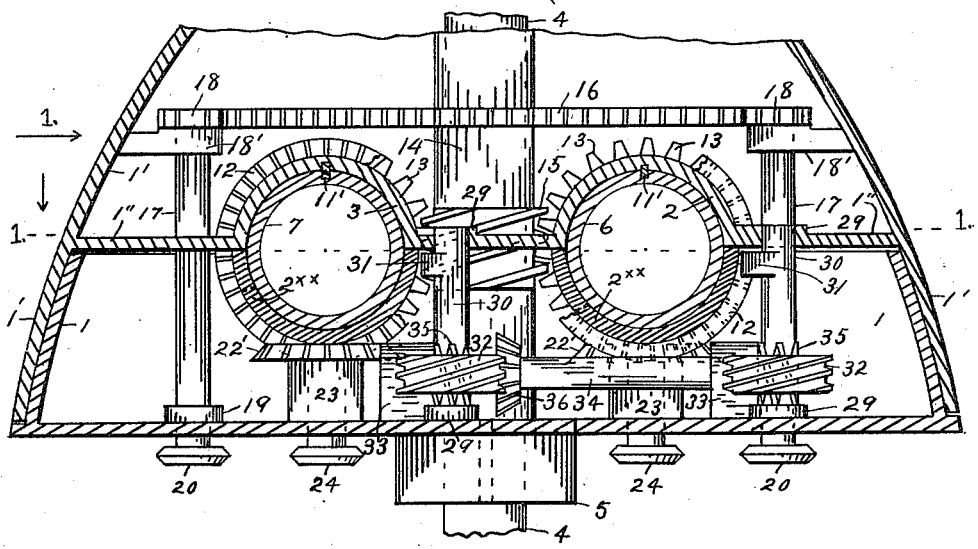
Figure 11:
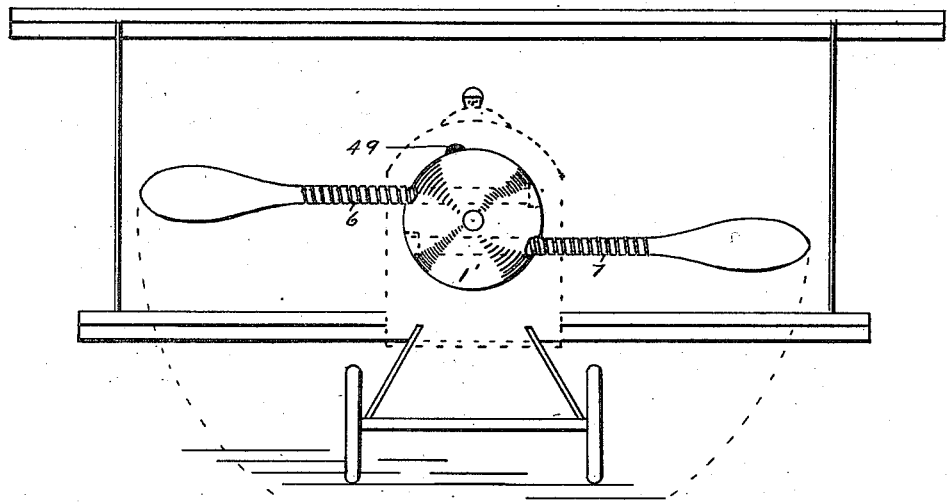
Figure 11 is, on reduced scale, a front perspective view of an airplane equipped with my devices.
Figure 5:
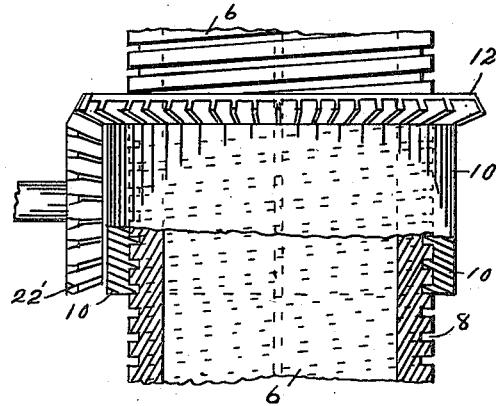
Figure 5 is on larger scale a like view of the last mentioned counter shaft similarly showing some of the elements by aid of which said shaft is longitudinally reciprocable.
Figure 4:
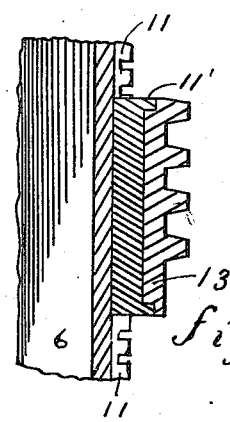
Figure 4 is a detailed view showing a part of one of the counter shafts which carry the propeller blades, and, in section, part of the therewith cooperative elements whereby axial rotation is imparted to the said counter shaft.
Figure 8:
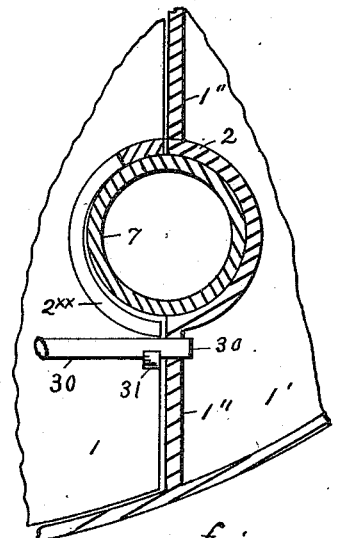
Figure 8 is a diagrammatic detailed view largely in section taken on line 8—8 of Figure 1 and viewed in the direction of the arrow, illustrative of one of the clamping devices for arresting the axial rotation of and clamping immovably the counter shafts at desired intermediate points.

The mechanism for holding or clamping in a desired position the counter shafts, after varying the angle of incidence of the thereby carried blades, or their radius, or extent of projection from the frame, is as follows:

Each outer counter shaft bearing 2, 3, of the frame 1, 1' is, as above noted, composed of two parts, the front one being integral with section 1', and the other, or rear, part with section 1 of the frame. In the wall of said rear part of the bearing near its junction with the wall of the frame, there is cut a slot $2^x$ (Figs. 1, 3 and 8) transversely of the axis of the bearing along approximately one-third of the circumference, thus producing a relatively loose part, or flap, $2^{xx}$ (Fig. 2) integral therewith, which is, as a brake, compressible inwardly toward the counter shaft to bind or clamp it.

In bearings 29 (Figs. 1, 2,) on the inside of the cone walls 1—1', and positioned on one side of, adjacent to, the shaft bearings 2, 3, are mounted, rotatably, cam shafts, 30, parallel with the power shaft 4, and transverse the blade-carrying counter-shafts 6, 7. Each of the shafts 30 has rigidly mounted thereon a raised peripheral cam, 31, and a helical gear 32.

The cam, 31, is disposed to bear against the end or edge of the said flap $2^{xx}$ of the shaft bearing, and, when required, to temporarily bend, and compress, the same against the thereto opposed counter shaft, thus clamping the latter against axial rotation, or longitudinal reciprocation.

Below said shafts 30, in bearings 33, on the rear wall of section 1 of the frame, are mounted rotatory intermediate shafts 34, on which are rigidly mounted helical gears 35, engaging with gears 32 on shaft 30, and bevel gears 36, meshing with bevel pinions 37 on shafts 38, mounted in bearings 39 located on said rear wall 1. (See Figs. 1-3.)

In the rear hub 5 of the frame and extending through the wall 1 are mounted, in suitable bearings, frictionally rotated shafts 40, having rigidly mounted on one end thereof friction pulleys 41, and on the opposite ends thereof helical gears 42, meshing with gears 43 on shafts 38.

Slidably mounted on the power shaft 4, at the rear of the hub 5, is an internal friction ring 44, having projecting rearwardly therefrom slide rods 45, journalled on the fuselage, or other relatively stationary part of the aircraft, in bearings 46. The ring 44 encircles the shaft 4 and is adapted to engage the friction wheels 41, on the shafts 40 and rotate the same at certain times, accordingly as the ring 44 is moved into or out of contact with the wheels 41.

As the ring 44 is non-rotative, it will be seen that, when the propeller is in rotation, the engagement of the ring with the frictions 41 will rotate the shafts 40, and, through the connecting gear trains, rotate the cam shafts 30 and actuate the cams 31 to simultaneously compress the flaps $2^{xx}$ to clamp the blade-carrying counter-shafts 6, 7, in their respective bearings as above described.

And also that further rotation of the shafts 40 will cause the cams 31 to release the flaps, and thus free the counter-shafts to be axially rotated or longitudinally reciprocated, or both.

To enable the aviator to determine, vary, and set the angles of the blades during rotation of his power shaft, a visual indicator is attached to one of the blade-carrying counter-shafts. This indicator moves automatically in correspondence with the axial rotations of the blades, and thus renders it possible to know their inclinations during their so rapid rotation as to be practically invisible.

My indicator is constructed as follows (see Figures 9 and 10):

On one side of the sleeve 9 projects a rigid stud, 47, having a ball head, 48, on the outer end thereof. On the rear wall of section 1 of the frame I pivot parallel with the power shaft 4, a telltale, or vane, 49, and midway of its length on a stud 49', rigidly fastened to the said back wall of section 1 of the frame on the inside thereof.

The vane 49 is adapted to be tilted or oscillated so that the opposite ends thereof are projectable alternately through an aperture or slot 49'' in the outside conoidal wall of the frame, whereby the vane visually indicates the direction and degree of the axial rotation of the blades according to the direction and extent to which tilted. Means are provided to accomplish such tilting as follows:

The vane 49 carries spaced away from its pivot 49' a ball stud 49× connected with the ball stud 47, on the sleeve 9, by a rod 50, having ball sockets 50', 50'', on each end thereof, and of such length that neither end of the vane is visible outside of the frame when the blades are in neutral inclination as shown in Figures 9–10.

The ends of said vane are marked, or painted in different colors, for example black and white, so as to be readily distinguishable by the aviator from his seat in the cockpit. The white end may be thus painted with phosphorescent paint so as to be visible at night and thus then indicate at least the positive inclination of the blades according to the extent of surface thereof showing outside of the frame, or the ends of the vane may be electrically, or otherwise, lighted so that each may show a different color, for example red and green in the darkness.

It will be understood that the power, or driving, shaft referred to is any shaft which carries and rotates the propeller, and need not be also the shaft to which the power is directly applied. Details of form and relative location and proportion of parts may be varied without departing from my invention.

What I claim as new and desire to secure by Letters Patent is the following, viz:

1. In an aircraft, a propeller device comprising a rotary driving shaft; a frame carried thereby; counter shafts longitudinally reciprocably carried by said frame, their axes transverse of, and offset from, the axis of the power shaft; propeller blades carried by said counter shafts and projecting outwardly from the frame; means to rotate the driving shaft; and intermediate means controllable by the aviator to intermittently operatively connect the driving shaft with the counter shafts to longitudinally reciprocate them to desired extent in either one of opposite directions independently of speed, or direction, of rotation of the driving shaft thereby correspondingly lengthening or shortening the projection of the blades from the frame.

2. In an aircraft a propeller device comprising a rotary driving shaft; a frame carried thereby; counter shafts longitudinally reciprocatably and axially rotatably carried by said frame, their axes transverse of, and offset from, the axis of the power shaft; exterior threads on said counter shafts; axially rotatable members having threads cooperative with the threads of the counter shafts; propeller blades carried by said counter shafts and projecting outwardly from the frame; means to rotate the driving shaft; and intermediate means controllable by the aviator to intermittently operatively connect the driving shaft with said axially rotatable members to rotate them to desired extent in either one of opposite directions, thereby independently of speed or direction of rotation of the driving shaft either lengthening or shortening as may be indicated the projection of the blades from the frame.

3. In an aircraft a propeller device comprising a rotary driving shaft; a frame carried thereby; counter shafts longitudinally reciprocatably and axially rotatably carried by said frame, their axes transverse of, and offset from, the axis of the power shaft; exterior threads on said counter shafts; axially rotatable members having threads cooperative with the threads of the counter shafts; propeller blades carried by said counter shafts and projecting outwardly from the frame; means to rotate the driving shaft; and intermediate means controllable by the aviator to intermittently operatively connect the driving shaft with the last mentioned rotatable members, whereby, by aid of the driving shaft, the counter shafts are simultaneously longitudinally reciprocated in different directions, independently of the speed, or direction, of rotation of the driving shaft.

4. In an aircraft a propeller device comprising a rotary power shaft; a frame carried thereby; blade carrying counter shafts mounted in said frame and longitudinally reciprocable to outwardly and inwardly move their blades relatively to the power shaft; means to rotate the driving shaft; and intermediate means, under control of the aviator, to, in different directions, so move said counter shafts during, and independently of speed or direction of, rotation of the power shaft.

5. In an aircraft a propeller device comprising a rotary power shaft; a frame carried thereby; counter shafts longitudinally reciprocably and axially rotatably carried by said frame, their axes transverse of, and offset from, the axis of the power shaft; propeller blades carried by the counter shafts and projecting outwardly from the frame; and means, controllable by the aviator, to, during rotation of the power shaft, longitudinally reciprocate said counter shafts; and, independent means similarly operable to simultaneously, or alternatively, axially rotate said counter shafts.

6. In an aircraft a propeller device comprising a rotary power shaft; a frame carried thereby; counter shafts longitudinally reciprocably and axially rotatably carried by said frame, their axes transverse of, and offset from, the axis of the power shaft; propeller blades carried by the counter shafts and projecting outwardly from the frame; and means, controllable by the aviator, to, intermittently, operatively connect the power shaft with the counter shafts to reciprocate them; and means, similarly controllable, to simultaneously, or alternatively, operatively connect the power shaft with the counter shafts to axially rotate them.

7. In an aircraft a propeller device comprising a rotary power shaft; a frame carried thereby; axially rotatable mutually parallel counter shafts carried by said frame respectively offset to different sides, and extended longitudinally in directions transverse of the axis of the power shaft; propeller blades carried by the counter shafts and oppositely projecting outwardly from the frame; exterior threads on the countershafts; and means controllable by the aviator and comprising axially rotatable, gear bearing, members having threads cooperative with the threads on the countershafts to intermittently operatively connect the power shaft with the counter shafts to axially rotate them to extents and in directions desired independently of speed, or direction, of rotation of the power shaft.

8. In an aircraft a propeller device comprising a rotary power shaft; a frame carried thereby; axially rotatable mutually parallel counter shafts carried by said frame respectively offset to different sides, and extended longitudinally in directions transverse of the axis of the power shaft; propeller bades carried by the counter shafts and oppositely projecting outwardly from the frame; means controllable by the aviator to axially rotate said counter shafts in opposite directions during rotation of the power shaft whereby the angles of incidence of the blades is varied; and a member movably carried by the frame and operatively connected with, and actuated by, said last mentioned means to, during said rotations, visually indicate to the aviator the said angles of incidence of the blades.

9. A propeller device comprising a rotatory driving shaft; a frame carried by and comprising portions thereof spaced apart from said shaft on opposite sides thereof; a pair of counter shaft bearings in and extending through said portions of the frame in alignment offset from the driving shaft; a counter shaft constantly journalled in both of said bearings and carrying at one end a propeller blade projecting outwardly from the frame; and means to longitudinally reciprocate said counter shaft so journalled whereby said projection of the blade is increased, and alternately diminished with, corresponding projecton of the non-blade bearing end of the counter shaft outwardly from the thereto most adjacent one of said bearings.

10. In an aerial propelling device, a rotatory driving shaft; a blade support rigidly mounted thereon; blade-carrying shafts mounted therein, variable as to length of radius of sweep; and means under control of the aviator for varying the radius of said shafts while the propeller is rotating and independently of the speed or direction of such rotation.

11. In an aircraft a propeller device comprising a rotary power shaft; a frame carried thereby; longitudinally reciprocable blade carrying shafts carried by said frame their axes transverse of and offset from the axis of the power shaft their blades projecting from the frame; means controllable by the aviator to, while the power shaft is rotating, reciprocate the blade carrying shafts in respectively different directions; and means similarly controllable to simultaneously arrest said reciprocations and thereby determine the projection of the blades from the frame.

12. In an aircraft a propeller device comprising a rotary power shaft; a frame carried thereby; longitudinally reciprocable blade carrying shafts carried by said frame their axes transverse of and offset from the axis of the power shaft their blades projecting from the frame; means controllable by the aviator to, while the power shaft is rotating, reciprocate the blade carrying shafts in respectively different directions; said last mentioned means comprising friction wheels having oppositely bevelled peripheries and unrotatably carried by supplementary rotatable shafts parallel with the power shaft; gears operatively connecting said supplementary shafts with the counter shafts; a member reciprocably carried by a relatively stationary part of the aircraft in parallelism with said supplementary shafts and containing an annular raceway having oppositely bevelled sides respectively cooperable with the respective bevels of said peripheries; and means operable by the aviator to reciprocate said member into and out of contact with said friction wheels.

13. In an aircraft a propeller device comprising a rotary power shaft; a frame carried thereby; blade carrying shaft axially rotatably and longitudinally reciprocably mounted in said frame; means to axially rotate, and means to at the same time with, or independently of, said axial rotation, reciprocate, said shafts, all of said means being operable by the aviator while the power shaft is rotating.

14. In an aircraft a propeller device comprising a rotary power shaft; a frame carried thereby; blade-carrying shafts axially rotatably and longitudinally reciprocably mounted in said frame; means to axially rotate said blade-carrying shafts; means to longitudinally and oscillatively reciprocate them; and both of said means being operable by the aviator simultaneously, or independently of each other; and means to limit their axial rotation, all of said actuating means being operable by the aviator either simultaeously, or independently of each other.

15. In an aircraft a propeller device comprising a rotary power shaft; a frame carried thereby; blade-carrying shafts axially rotatably and longitudinally reciprocably mounted in said frame; means to axially rotate said blade-carrying shafts; means to longitudinally and oscillatively reciprocate them; and both of said means being operable by the aviator simultaneously, or independently of each other; means to limit their axial rotation, all of said actuating means being operable by the aviator either simultaneously or independently of each other; and means to limit their longitudinal reciprocation.

16. In an aircraft a propeller device comprising a rotatory power shaft; a frame carried and rotated thereby; counter-shafts carried, axially rotatable in opposite directions, by the frame; propeller blades carried by the counter-shafts; means to rotate the power shaft; means to simultaneously equally axially rotate said counter shafts during rotation of the power shaft; an indicator carried by said frame and movable in opposite directions by opposite oscillative movements of the counter shafts; and means actuated by aid of said last mentioned means to so move the indicator according to the directions of the axial rotations of the counter shafts.

17. In an aerial propelling device, a rotatory power shaft; a blade support rigidly mounted thereon; blade-carrying-shafts mounted therein, variable as to length of radius of sweep; and means for varying radius of said shafts while the propeller is in rotation.

18. In a propelling device, a rotatory power shaft; a blade support rigidly mounted thereon, propelling blades, variable as to length of radius, movably mounted thereon; mechanical means for extending or retracting said blades; mechanical means for rigidly clamping said blades after such extension or retraction; and manually actuated means to put in action said mechanical clamping means.

19. In an aerial propelling device, a rotatory power shaft; a blade-support rigidly mounted thereon; blade-carrying shafts carried thereby and movable axially; opposed synchronously operating gear trains adapted to lengthen or shorten the radius of said blade-carrying shafts simultaneously; frictionally actuated means to set in action said blade-shaft length-varying means; and manually actuated means under the control of the aviator to set in action said frictional mechanism while the propeller is in motion.

20. In an aerial propelling device, a rotatory power shaft; a propeller blade-carrying shaft support; blade shafts mounted in said support; propeller blades carried thereby and extendable longitudinally; gear trains connecting with said blade shafts; and frictional means for setting in action said gear trains and comprising rotative and non-rotative members.

21. In a propelling device, having inclinable blades, a visual blade-angle indicator connected therewith and automatically and synchronously variable by movement of the propeller blades.

22. In a propelling device in combination a rotary power shaft; a frame rotatably carried thereby; propeller blade-carrying shafts axially rotatably, or oscillatively, mounted therein; means to oscillate said last mentioned shafts while the propeller is in rotation; and a visual blade-angle indicator operatively connected with said blade-carrying-shafts and adapted to be moved by aid thereof in synchronism and correspondence therewith to designate the degree and direction of the axial rotation of the blade-carrying-shafts.

23. A propelling device comprising a rotatory driving shaft; a frame carried thereby and comprising portions thereof spaced apart from said shaft on opposite sides thereof; a pair of counter-shaft bearings in and extending through said portions of the frame in alignment and offset from the driving shaft; a counter shaft constantly journalled in both said bearings extending through, to projection thereof from both sides of, the frame, and carrying an outwardly projecting propeller blade carried by one end of the counter shaft; and means to bi-directionally longitudinally reciprocate said countershaft so journalled whereby said projection of the blade is optionally increased or diminished and projection of the opposite end of the counter shaft inversely varied.

24. In combination in a propelling device axially rotatable longitudinally reciprocable propeller blades; means to axially rotate them thereby varying their angles of incidence; means to longitudinally reciprocate them thereby varying their radius of sweep, and means to intermediately hold them to any said angle and radius desired.

HERBERT E. HAWES.